United States Patent
Alfiad et al.

(10) Patent No.: US 10,659,854 B1
(45) Date of Patent: May 19, 2020

(54) PLUGGABLE AGGREGATION MODULE FOR AN OPTICAL NETWORK

(71) Applicant: ADVA Optical Networking SE, Meiningen OT Dreissigacker (DE)

(72) Inventors: Mohammad Alfiad, Duluth, GA (US); Niall Robinson, Denver, CO (US); Ross Saunders, Ottawa (CA)

(73) Assignee: ADVA OPTICAL NETWORKING SE, Meiningen ot Dreissigacker (DE)

( * ) Notice: Subject to any disclaimer, the term of this patent is extended or adjusted under 35 U.S.C. 154(b) by 0 days.

(21) Appl. No.: 16/372,344

(22) Filed: Apr. 1, 2019

(51) Int. Cl.
*H04Q 11/00* (2006.01)

(52) U.S. Cl.
CPC ..... *H04Q 11/0071* (2013.01); *H04Q 11/0005* (2013.01); *H04Q 2011/0016* (2013.01); *H04Q 2011/0035* (2013.01)

(58) Field of Classification Search
CPC .......... H04Q 11/0071; H04Q 11/0005; H04Q 2011/0016; H04Q 2011/0035
USPC ........................................................ 398/48
See application file for complete search history.

(56) References Cited

U.S. PATENT DOCUMENTS

| | | | |
|---|---|---|---|
| 9,337,993 B1* | 5/2016 | Lugthart ................. | H04L 7/033 |
| 9,900,103 B1* | 2/2018 | Lee ......................... | H04B 10/40 |
| 9,997,202 B2 | 5/2018 | Musk | |
| 2011/0013911 A1* | 1/2011 | Alexander ............. | H04B 10/29 398/79 |
| 2015/0055664 A1* | 2/2015 | Kanonakis ........ | H04L 12/40136 370/535 |
| 2015/0110502 A1* | 4/2015 | Hosking .............. | H04B 10/564 398/182 |
| 2018/0034660 A1* | 2/2018 | Mehta ................. | H04L 12/4013 |
| 2018/0041280 A1* | 2/2018 | Elahmadi ........... | H04B 10/6162 |
| 2018/0102834 A1* | 4/2018 | Ibach ....................... | H04J 3/14 |

* cited by examiner

*Primary Examiner* — Dalzid E Singh
(74) *Attorney, Agent, or Firm* — Jenkins, Wilson, Taylor & Hunt, P.A.

(57) ABSTRACT

A pluggable aggregation module adapted to be plugged into a network device of an optical network, said pluggable aggregation module comprising optical frontends configured to connect said pluggable aggregation module with a corresponding number of modules to exchange optical signals via optical fibres in legacy signal formats; and an electrical conversion circuit configured to convert the legacy signal formats to an internal signal format used by said network device.

14 Claims, 13 Drawing Sheets

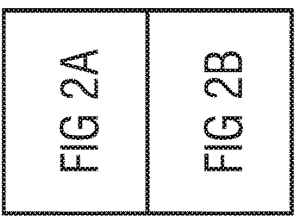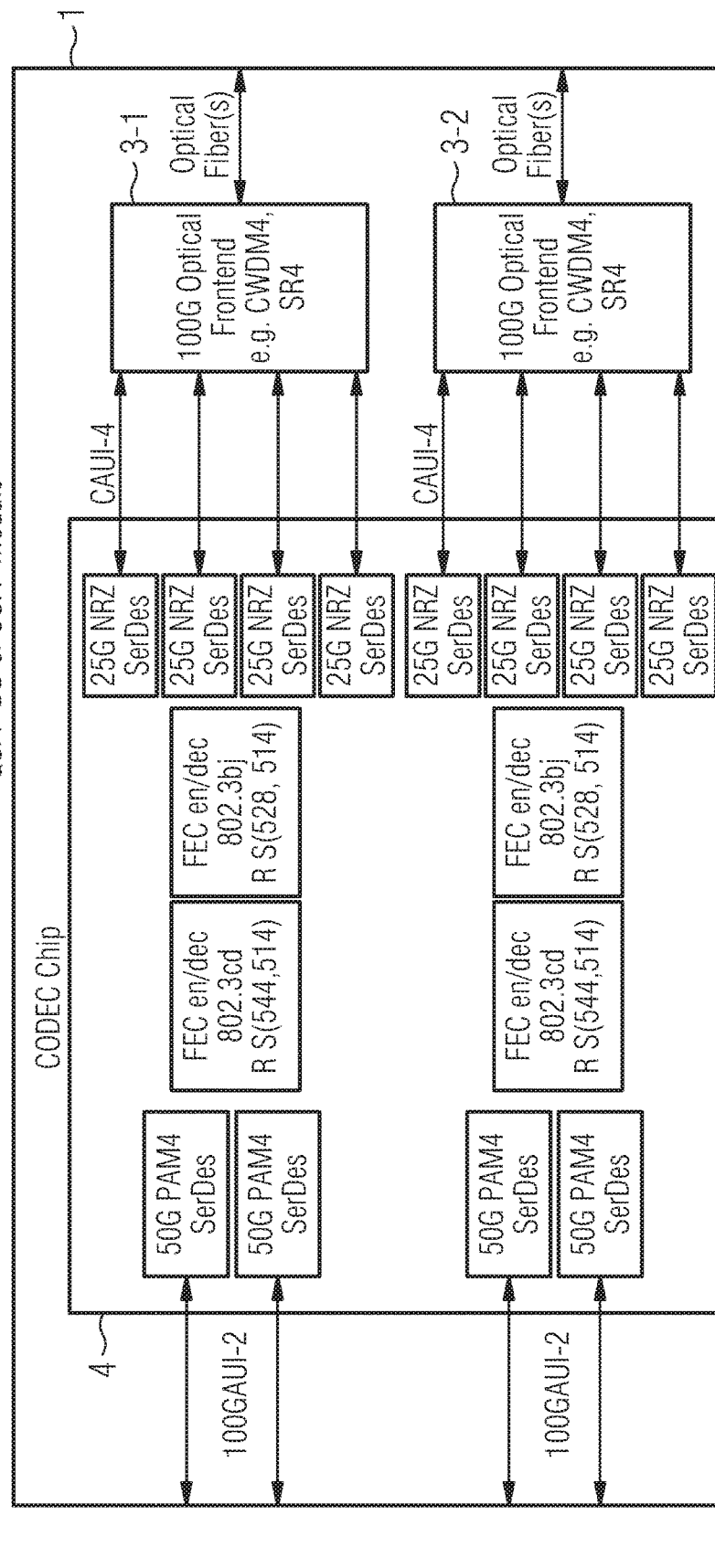

| FIG 3A |
|--------|
| FIG 3B |

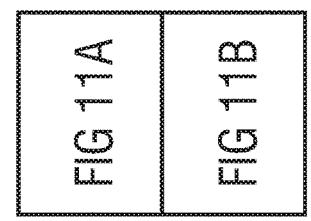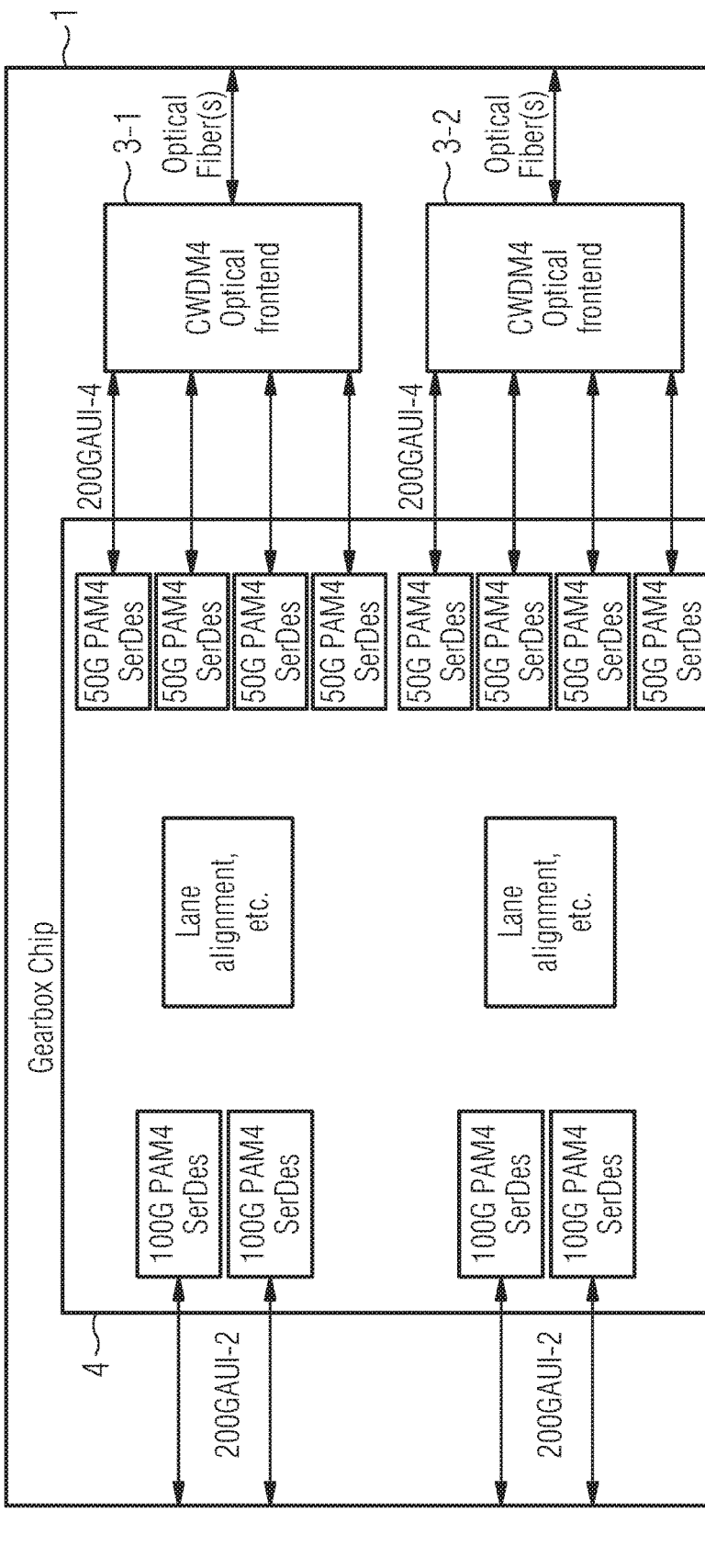

PLUGGABLE AGGREGATION MODULE FOR AN OPTICAL NETWORK

FIELD OF THE INVENTION

The invention relates to a pluggable aggregation module adapted to be plugged into a network device of an optical network.

BACKGROUND

Optical networks can comprise a plurality of network nodes or network devices which are connected to each other via optical fibers. The network devices can comprise switches and routers used to forward optical signals from a source network node to a destination network node. Pluggable modules can be used to connect two network devices via optical cables. Optical signals transported via optical fibers are converted into electrical signals to be processed by data processing means of the receiving network device. For instance, the optical network can comprise a plurality of network devices manufactured by different producers and including different technical functions with a wide variety of different network devices using different internal signal formats for data processing. Pluggable modules can be plugged into sockets of a host board of a network device to connect the network device with another network device via an optical cable comprising one or more optical fibers. However, the available space on a host board of a network device is limited so that the number of available sockets of a host board of a network device is also restricted. Since different network devices can use different signal formats and comprise only a limited number of sockets to receive pluggable modules, the flexibility to set up an optical network is low and in some scenarios, it can become difficult or even impossible to connect two network devices of an optical network to each other because of the different used signal formats and the limited number of available sockets. Accordingly, there is a need to provide a pluggable module for an optical network which increases the flexibility to set up an optical network.

SUMMARY OF THE INVENTION

The invention provides according to a first aspect a pluggable aggregation module adapted to be plugged into a network device of an optical network, wherein said pluggable aggregation module comprises optical frontends configured to connect said pluggable aggregation module with a corresponding number of modules in particular legacy modules to exchange optical signals via optical fibres in legacy signal formats and an electrical conversion circuit configured to convert the legacy signal formats to an internal signal format used by said network device.

In a possible embodiment of the pluggable aggregation module according to the first aspect of the present invention, the electrical conversion circuit comprises a reconfigurable integrated conversion circuit programmable to convert the signal formats of exchanged optical signals including different legacy formats and internal signal formats.

In a further possible embodiment of the pluggable aggregation module according to the first aspect of the present invention, the reconfigurable integrated conversion circuit comprises a FlexEthernet chip having serializer/de-serializer circuits connectable to a host board of said network device and serializer/de-serializer circuits connected to the optical frontends integrated in said pluggable aggregation module.

In a further possible embodiment of the pluggable aggregation module according to the first aspect of the present invention, the electrical conversion circuit is configured to multiplex and/or to de-multiplex signals exchanged between the network device and different legacy modules.

In a further possible embodiment of the pluggable aggregation module according to the first aspect of the present invention, the multiplexed and/or de-multiplexed signals comprise Ethernet signals with different data rates.

In a further possible embodiment of the pluggable aggregation module according to the first aspect of the present invention, the electrical conversion circuit comprises a Codec chip having serializer/de-serializer circuits connectable to a host board of said network device and serializer/de-serializer circuits connected to the optical frontends integrated in the pluggable aggregation module.

In a further possible embodiment of the pluggable aggregation module according to the first aspect of the present invention, the Codec chip comprises FEC encoder and FEC decoder circuits provided for signal format conversions between legacy signal formats and internal signal formats used by said network device.

In a further possible embodiment of the pluggable aggregation module according to the first aspect of the present invention, the electrical conversion circuit comprises a gearbox chip having serializer/de-serializer circuits connectable to a host board of said network device and serializer/de-serializer circuits connected to optical frontends integrated in said pluggable aggregation module.

In a further possible embodiment of the pluggable aggregation module according to the first aspect of the present invention, the pluggable aggregation module comprises a negotiation unit adapted to negotiate signal parameters with the legacy modules.

In a further possible embodiment of the pluggable aggregation module according to the first aspect of the present invention, the negotiation unit is further adapted to negotiate signal formats with the legacy modules.

In a further possible embodiment of the pluggable aggregation module according to the first aspect of the present invention, the negotiation unit is further adapted to negotiate signal parameters and/or signal formats with the network device into which the pluggable aggregation module has been plugged.

In a further possible embodiment of the pluggable aggregation module according to the first aspect of the present invention, the negotiation unit is further adapted to negotiate bit rates and/or FEC types and/or port counts and/or modulation formats with the legacy modules and/or with the pluggable aggregation module into which the pluggable aggregation module has been plugged.

In a further possible embodiment of the pluggable aggregation module according to the first aspect of the present invention, the pluggable aggregation module plugged into a socket of a host board of a network device is connected to a switching fabric chip or to an optical coherent DSP chip of said network device.

In a further possible embodiment of the pluggable aggregation module according to the first aspect of the present invention, legacy signal formats can comprise a SR4, a PSM4, a CWDM4 and/or other signal formats.

In a further possible embodiment of the pluggable aggregation module according to the first aspect of the present invention, the legacy modules can comprise QSFP modules, CFP4 modules, CFP2 modules and CFP modules.

In a still further possible embodiment of the pluggable aggregation module according to the first aspect of the present invention, the network device comprises a switch device or a router device of the optical network.

The invention further provides according to a further aspect a network device comprising a host board having at least one socket to receive a pluggable aggregation module comprising optical frontends configured to connect said pluggable aggregation module with a corresponding number of modules of said optical network to exchange optical signals via optical fibres in legacy signal formats and an electrical conversion circuit configured to convert the legacy signal formats to an internal signal format used by said network device.

In a possible embodiment of the network device according to the second aspect of the present invention, the network device comprises a switch device of the optical network.

In a further possible embodiment of the network device according to the second aspect of the present invention, the network device comprises a router device of the optical network.

BRIEF DESCRIPTION OF FIGURES

In the following, possible exemplary embodiments of the pluggable aggregation module according to the first aspect of the present invention and of the network device according to the second aspect of the present invention are described in more detail with reference to the enclosed figures.

DETAILED DESCRIPTION OF EMBODIMENTS

Figure 1:
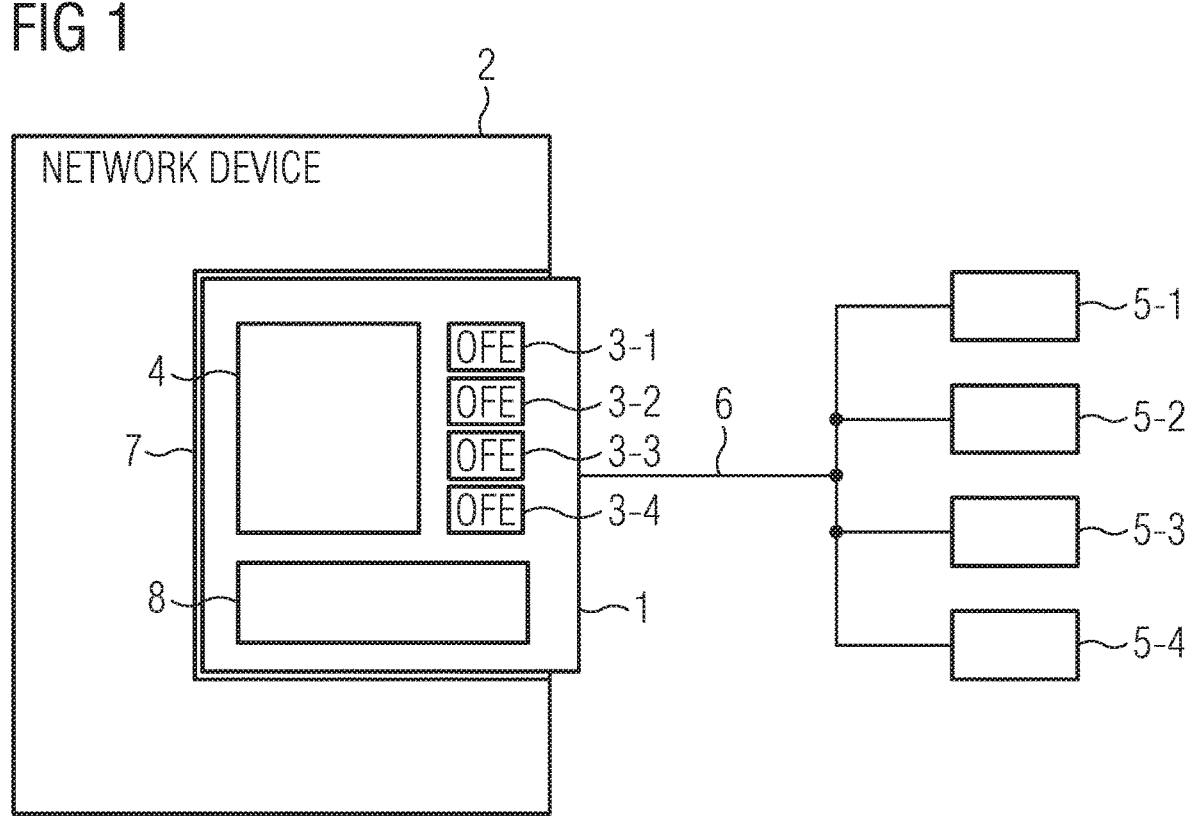
FIG. 1 shows a schematic diagram for illustrating a possible exemplary embodiment of a pluggable aggregation module according to the first aspect of the present invention.

As can be seen from the schematic block diagram of FIG. 1, a pluggable aggregation module 1 according to the first aspect of the present invention is adapted to be plugged into a network device 2 of an optical network. The network device 2 can for instance comprise a router or a switch of the optical network. The pluggable aggregation module 1 illustrated in the block diagram of FIG. 1 comprises one or more optical frontends 3-$i$ and at least one electrical conversion circuit 4. In the illustrated embodiment of FIG. 1, the pluggable aggregation module 1 comprises four optical frontends 3-1, 3-2, 3-3, 3-4 connected to an electrical conversion circuit 4. The optical frontends 3-$i$ of the pluggable aggregation module 1 are configured to connect said pluggable aggregation module 1 with a corresponding number of modules 5-$i$, in particular legacy modules to exchange optical signals via optical fibers 6 in legacy signal formats. In the illustrated embodiment of FIG. 1, four legacy modules 5-1, 5-2, 5-3, 5-4 are connected via optical fibers 6 to a corresponding number of optical frontends 3-1, 3-2, 3-3, 3-4 integrated in the pluggable aggregation module 1. The optical fibers 6 can be bundled in an optical cable. The electrical conversion circuit 4 integrated in the pluggable aggregation module 1 is configured to convert the legacy signal formats into an internal signal format used by the network device 2. The pluggable aggregation module 1 is plugged into a socket 7 of a host board of the network device 2 as illustrated schematically in FIG. 1. The socket 7 of the host board provides an electrical interface with the electrical conversion circuit 4 of the pluggable aggregation module 1. In a possible embodiment the pluggable aggregation module 1 can also be used just to aggregate traffic from lower speed modules without sacrificing faceplate density of the host-board.

In a possible embodiment, the pluggable aggregation module 1 further comprises a negotiation unit 8 adapted to negotiate signal parameters and/or signal formats with the legacy modules 5-$i$ of the network. The negotiation unit 8 can further be adapted to negotiate also signal parameters and/or signal formats with the network device 2 into which the pluggable aggregation module 1 has been plugged. In a possible embodiment, the negotiation unit 8 is adapted to negotiate bit rates and/or FEC types and/or port counts of the signals and/or modulation formats both with the different legacy modules 5-$i$ and with the network device 2. In a possible embodiment, the negotiation unit 8 is adapted to perform an auto-configuration of the respective datalink. In a possible embodiment, the negotiation unit 8 comprises a processor to perform a negotiation and/or auto-configuration procedure in a negotiation protocol using an associated negotiation signal format. In a possible embodiment, the negotiation unit 8 performs negotiations with different legacy modules 5-$i$ via the optical fiber link 6 in parallel. In a possible embodiment, the different legacy modules 5-$i$ comprise corresponding negotiation units to communicate with the negotiation unit 8 of the pluggable aggregation module 1. The negotiations between the legacy modules 5-$i$ and the negotiation unit 8 of the pluggable aggregation module 1 can be performed in a possible embodiment via an embedded communication channel ECC. In an alternative embodiment, the communication between the pluggable modules 5-$i$ and the negotiation unit 8 of the pluggable aggregation module 1 can be performed via a separate supervisory communication channel. In a possible embodiment, renegotiations and/or reconfigurations can also be performed during operation of the network, in particular during data exchange between the pluggable aggregation module 1 and the legacy modules 5-$i$ via the optical fibers 6. In a possible embodiment, the negotiation unit 8 can communicate with a processing unit of the network device 2 via the electrical interface of the socket 7. In a possible embodiment, the negotiation unit 8 can inform the processing unit of the network device 2 about the type and number of the legacy modules 5-i to negotiate different signal parameters and/or signal formats as well as bit rates and/or FEC types and/or port counts with the network device 2. The modulation formats negotiated by the negotiation unit 8 can for instance comprise a NRZ, PAM4, etc. modulation format. The negotiated legacy signal formats can for instance comprise a SR4, a PSM4, a CWDM4 or a LR4 signal format.

The pluggable aggregation module 1 can be plugged into the socket 7 of the host board of the network device 2 and thereby be connected to a switching fabric chip or to an optical coherent DSP chip of the network device 2. The legacy modules 5-i can comprise different types of modules, in particular QSFP modules, CFP4 modules, CFP2 modules and CFP modules.

Figures 3, 3A:
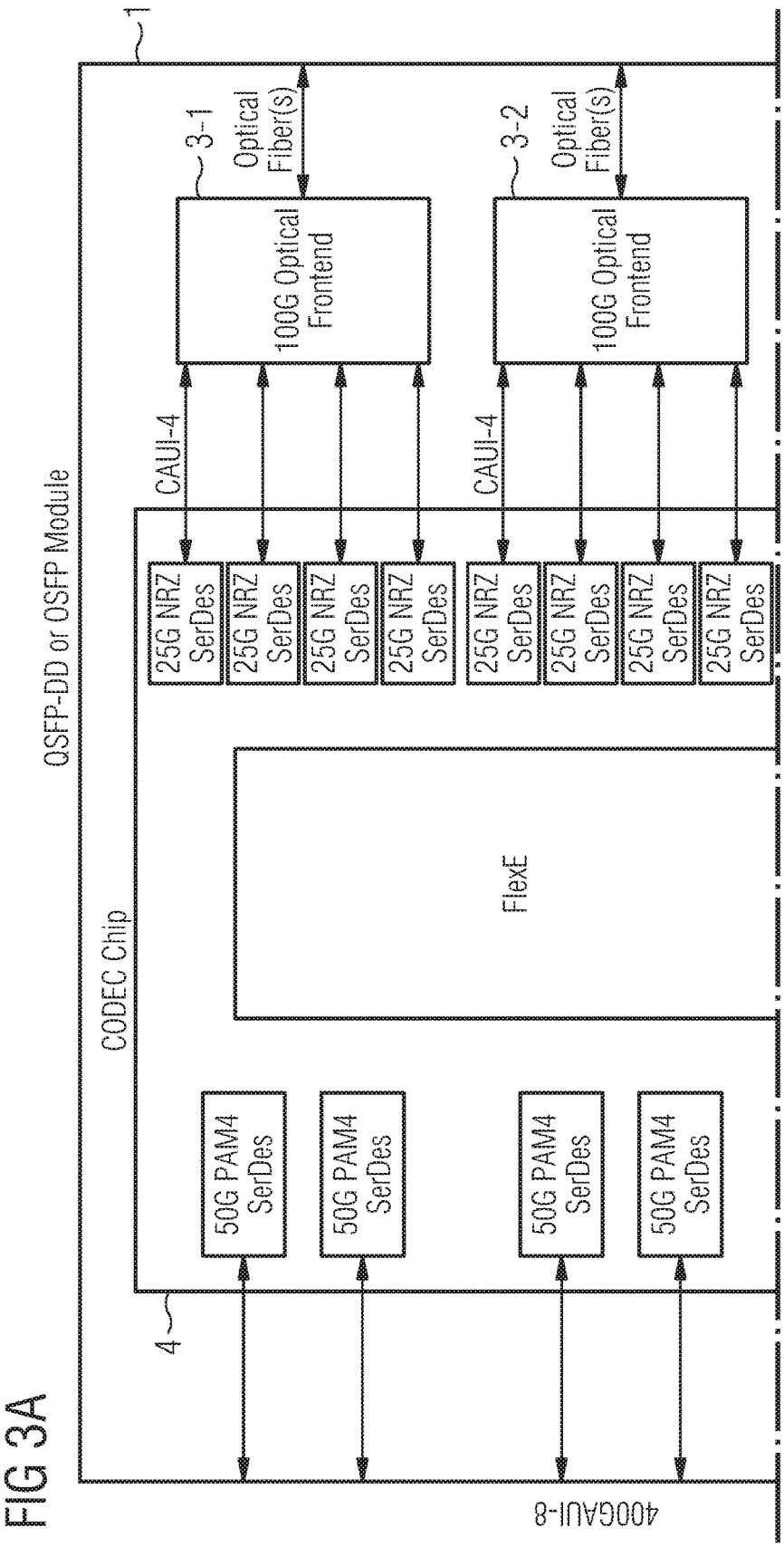
FIG. 3 shows a block diagram of a further possible exemplary embodiment of a pluggable aggregation module according to the first aspect of the present invention.
Figure 3B:
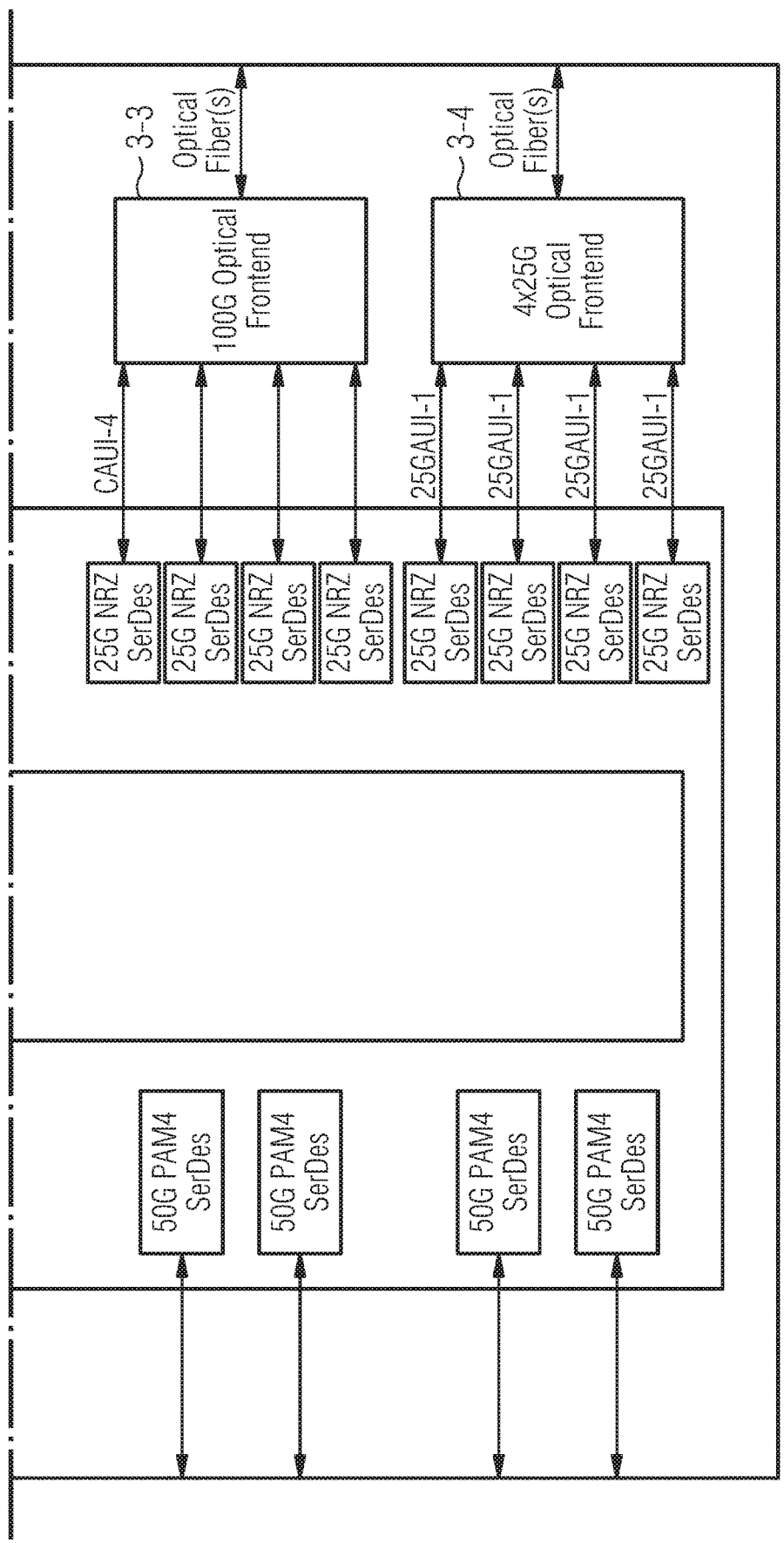

In a possible embodiment of the pluggable aggregation module 1 as illustrated in FIG. 1, the electrical conversion circuit 4 can comprise a reconfigurable integrated conversion circuit being programmable to convert the signal formats of exchanged optical signals including different legacy formats and internal signal formats. The processing unit of the network device 2 can process data in the electrical domain in a possible embodiment in a predetermined internal signal format. In a further possible embodiment, the network device 2 may comprise a processing unit which is capable of processing different internal signal formats. In a possible embodiment, the reconfigurable integrated conversion circuit 4 can comprise a FlexEthernet chip as also illustrated in the embodiment of FIG. 3. This integrated conversion circuit 4 can comprise serializer/de-serializer circuits connectable to the host board of the network device 2 and serializer/de-serializer circuits connected to the different optical frontends 3-i integrated in the pluggable aggregation module 1 as also illustrated in FIG. 3. In a possible embodiment, the electrical conversion circuit 4 is further adapted to multiplex and/or to de-multiplex signals exchanged between the network device 2 and different legacy modules 5-i. For example, the pluggable aggregation module 1 illustrated in the embodiment of FIG. 3 is capable of multiplexing and de-multiplexing signals exchanged between the network device 2 and different legacy modules 5. In a possible embodiment, the multiplexed and/or de-multiplexed signals can comprise Ethernet signals with different data rates. Different data rates can in a possible implementation be negotiated by the negotiation unit 8 of the pluggable aggregation module 1 as illustrated in the embodiment of FIG. 1.

Figure 2B:
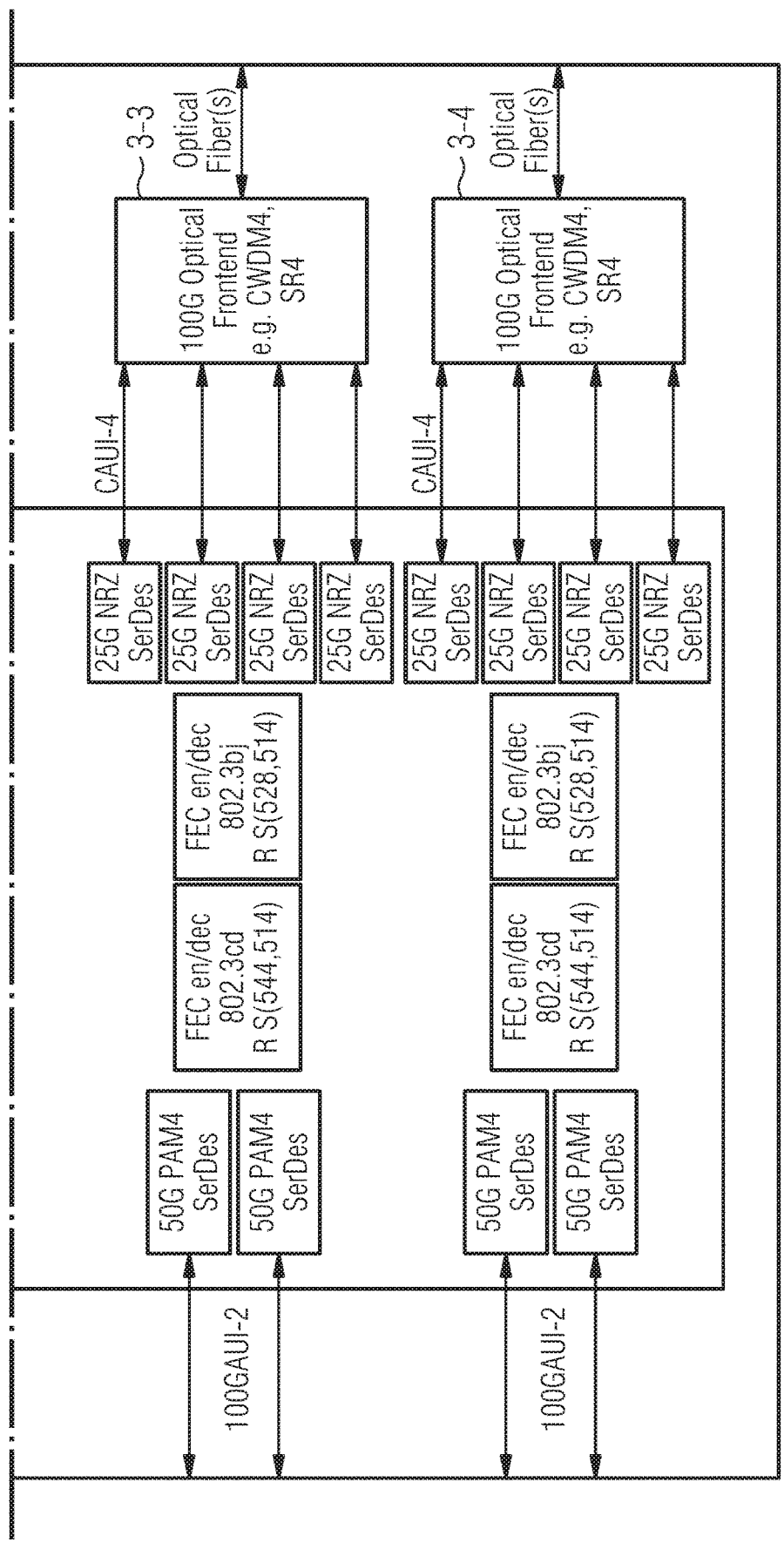
FIG. 2 shows a block diagram of a possible exemplary embodiment of a pluggable aggregation module according to the first aspect of the present invention.

In a further possible embodiment of the pluggable aggregation module 1, the electrical conversion circuit 4 can comprise a Codec chip as also illustrated in the embodiment of FIG. 2. A Codec chip can comprise serializer/de-serializer circuits connectable to the host board of the network device 2 and serializer/de-serializer circuits connected to the optical frontends 3-i integrated in the pluggable aggregation module 1 as also shown in FIG. 2. The Codec chip can further comprise FEC encoders and FEC decoder circuits provided for signal format conversions between legacy signal formats and internal signal formats used by the processing unit of the network device 2.

Figure 11B:
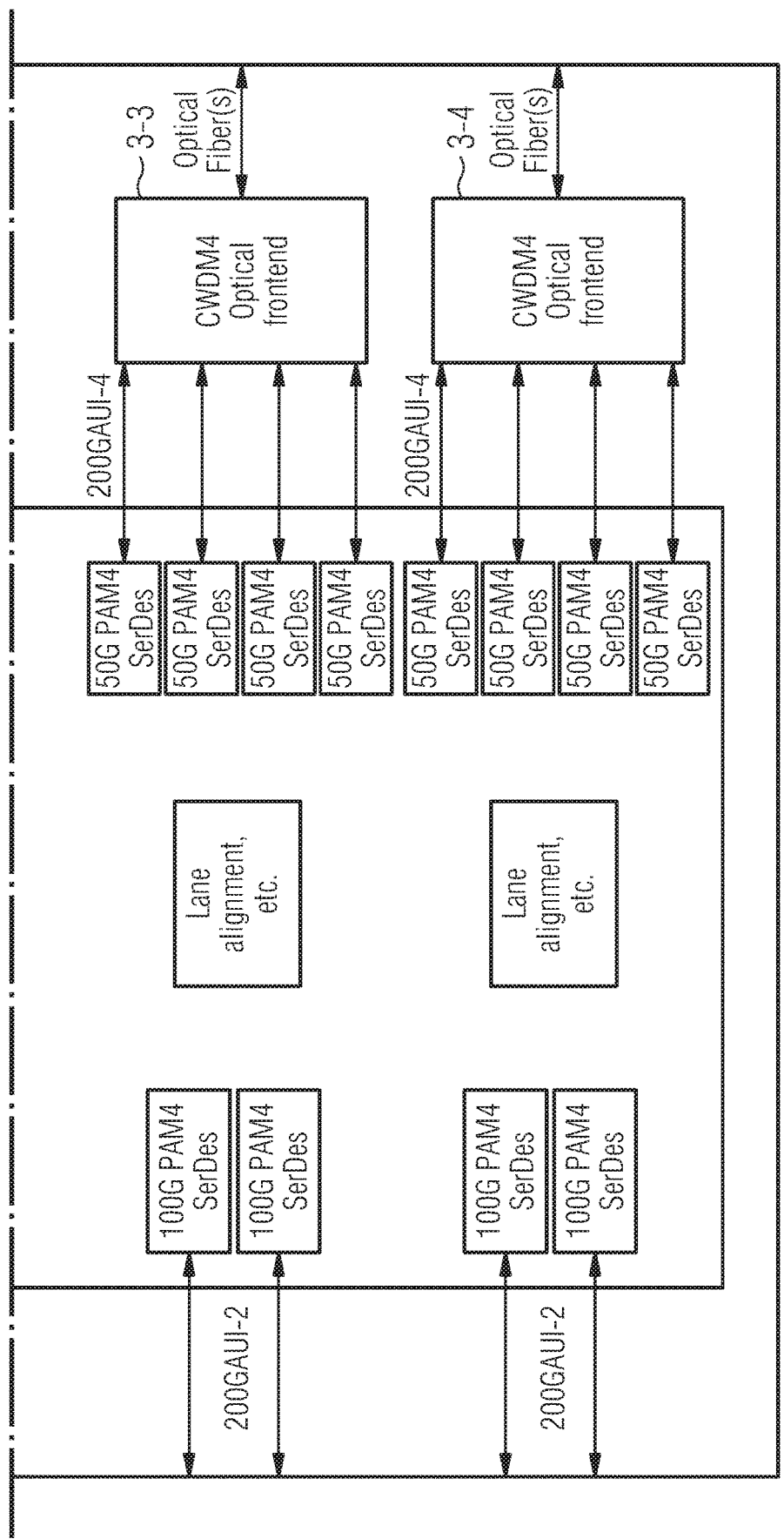
FIG. 11 shows a block diagram of a further possible exemplary embodiment of a pluggable aggregation module according to the first aspect of the present invention.

In a further possible embodiment, the electrical conversion circuit 4 comprises a gearbox chip as also illustrated in the embodiment of FIG. 11. The gearbox chip can comprise serializer/de-serializer circuits connectable to a host board of a network device 2 and serializer/de-serializer circuits connected to the optical frontends 3-i integrated in the same pluggable aggregation module 1.

FIG. 2 shows a block diagram of a possible embodiment of the pluggable aggregation module 1 according to the first aspect of the present invention. The pluggable aggregation module 1 illustrated in FIG. 2 is not only capable to aggregate signals originating from different legacy modules 5-i but also to multiplex and/or to de-multiplex such signals. The pluggable aggregation module 1 can be built into a QSFP-DD. The pluggable aggregation module 1 of FIG. 2 interfaces with the host board of the network device 2 using eight high-speed lanes according to the MSA specifications. In the illustrated embodiment of FIG. 2, these high-speed lanes are used to carry four sets of asynchronous 100GAUI-2 channels, wherein each channel is run on two 50-Gbit/sec PAM4 lanes. The pluggable aggregation module 1 of FIG. 2 comprises a Codec chip as an electrical conversion circuit 4 that is adapted to convert the four 100GAUI-2 channels (2×50-Gbit/sec) into four 100G-CAUI4 channels (4×25-Gbit/sec). These channels interface with the optical frontends 3-i that are adapted to support legacy signal formats such as SR4, PSM4, CWDM4 and LR4, which allows to aggregate the traffic from legacy modules 5-i. As can be seen in the illustrated embodiment of FIG. 2, the Codec chip comprises serializer/de-serializer circuits to connect the Codec chip on the one side with the host board of the network device 2 and on the other side with the optical frontends 3-i integrated in the pluggable aggregation module 1. Further, the Codec chip 4 comprises legacy encoder/decoder circuits as illustrated in the embodiment of FIG. 2.

FIG. 3 shows a further exemplary embodiment of the pluggable aggregation module 1 according to the first aspect of the present invention. In the embodiment of FIG. 3, the electrical conversion circuit 4 comprises a FlexEthernet chip (FlexE) also having serializer/de-serializer circuits connectable to the host board of the network device 2 and serializer/de-serializer circuits connected to the optical frontends 3-i integrated in the pluggable aggregation module 1. The use of a FlexEthernet chip implemented in the electrical conversion circuit 4 provides a reconfigurable integrated conversion which can be programmed to convert signal formats of exchanged optical signals including different legacy and/or internal signal formats. The embodiment illustrated in FIG. 3 allows a mixture of different data rates to be multiplexed together inside the same module. In this specific example illustrated in FIG. 3, three 100 GbE channels are multiplexed together with four 25 GbE channels to form a 400 GbE channel.

Figure 4:
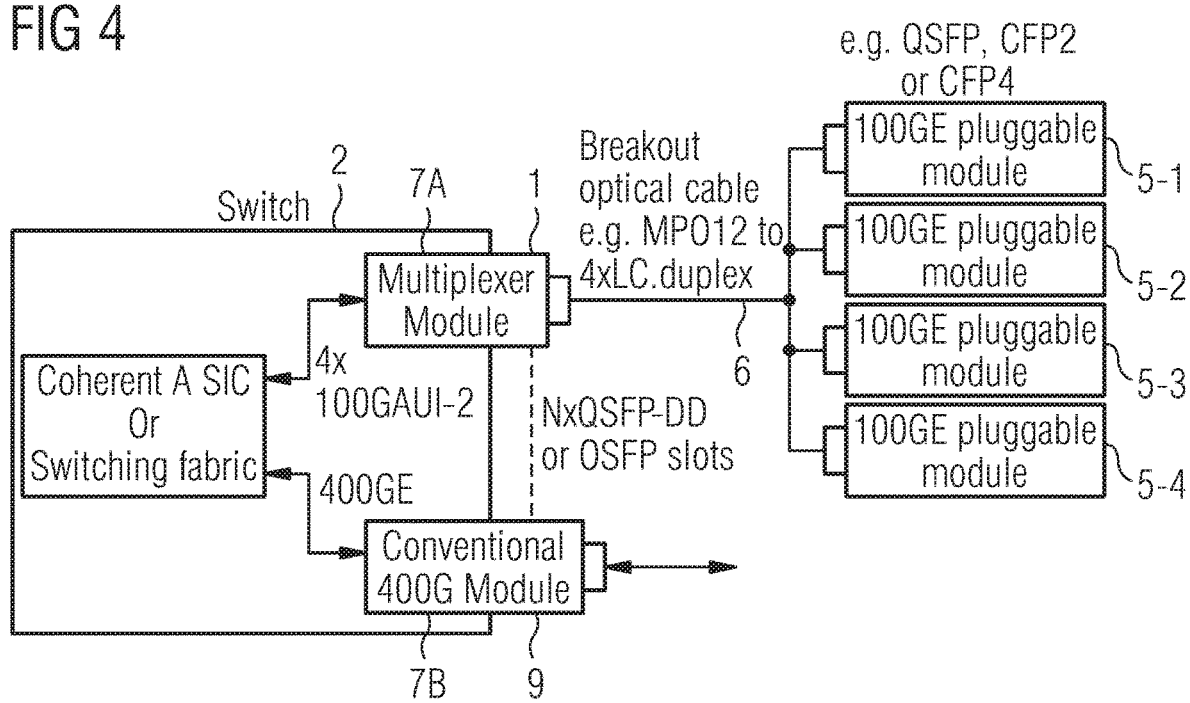
FIG. 4 shows an exemplary network device with a plugged-in pluggable aggregation module according to the first aspect of the present invention.
Figure 5:
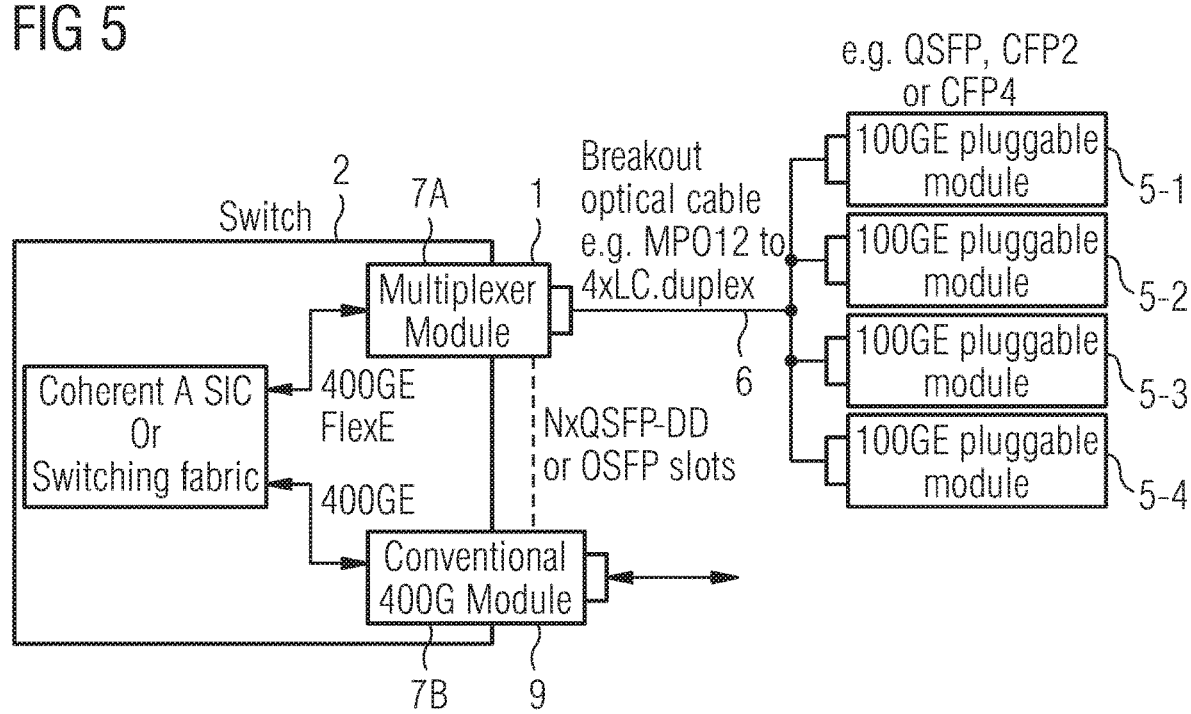
FIG. 5 shows a further exemplary configuration of a network device with a plugged-in pluggable aggregation module according to the first aspect of the present invention.

FIG. 4 shows an exemplary network configuration using a pluggable aggregation module 1 according to the present invention. In the illustrated setup of FIG. 4, the network device 2 comprises a switch having two sockets 7A, 7B adapted to receive pluggable modules. In the illustrated example of FIG. 4, the pluggable aggregation module 1 according to the present invention is plugged into the first socket 7A of the host board of the switch network device 2. A conventional 400G pluggable module is plugged into the other socket 7B of the host board of the switch network device 2. Both plugged-in modules 1, 9 are connected via the host board electrical interface to a processing unit of the network device 2. The processing unit can comprise a switching fabric or an optical coherent DSP chip. The configuration illustrated in FIG. 4 shows how traffic from four 100GE optical pluggable modules 5-1, 5-2, 5-3, 5-4 (e.g. CFP, CFP2 or CFP4) can be multiplexed using the pluggable aggregation module 1 according to the present invention having multiplexing capabilities. The purpose of the configuration illustrated in FIG. 4 is to provide support for legacy optical modules 5-*i* on the latest switching platforms without sacrificing on the faceplate density of the network device 2. The legacy modules 5-*i* can be connected to the pluggable aggregation module 1 using a breakout (or fanout) optical cable including the optical fibers 6. This can be an MPO-to-nxLC or MPO-to-nx MPO cable depending on the types of optical legacy modules 5-*i*. On the electrical side, the pluggable aggregation module 1 is interfacing with the switching fabric chip or with the optical coherent DSP chip of the network device 2. In the illustrated embodiment of FIG. 4, the traffic which is running between the processing unit of the network device 2 and the pluggable aggregation module 1 is a 4×100GAUI-2 traffic, while in the embodiment illustrated in FIG. 5, the traffic comprises a FlexE 400GE traffic. The type of traffic depends on the multiplexing configuration of the pluggable aggregation module 1.

Figure 6:
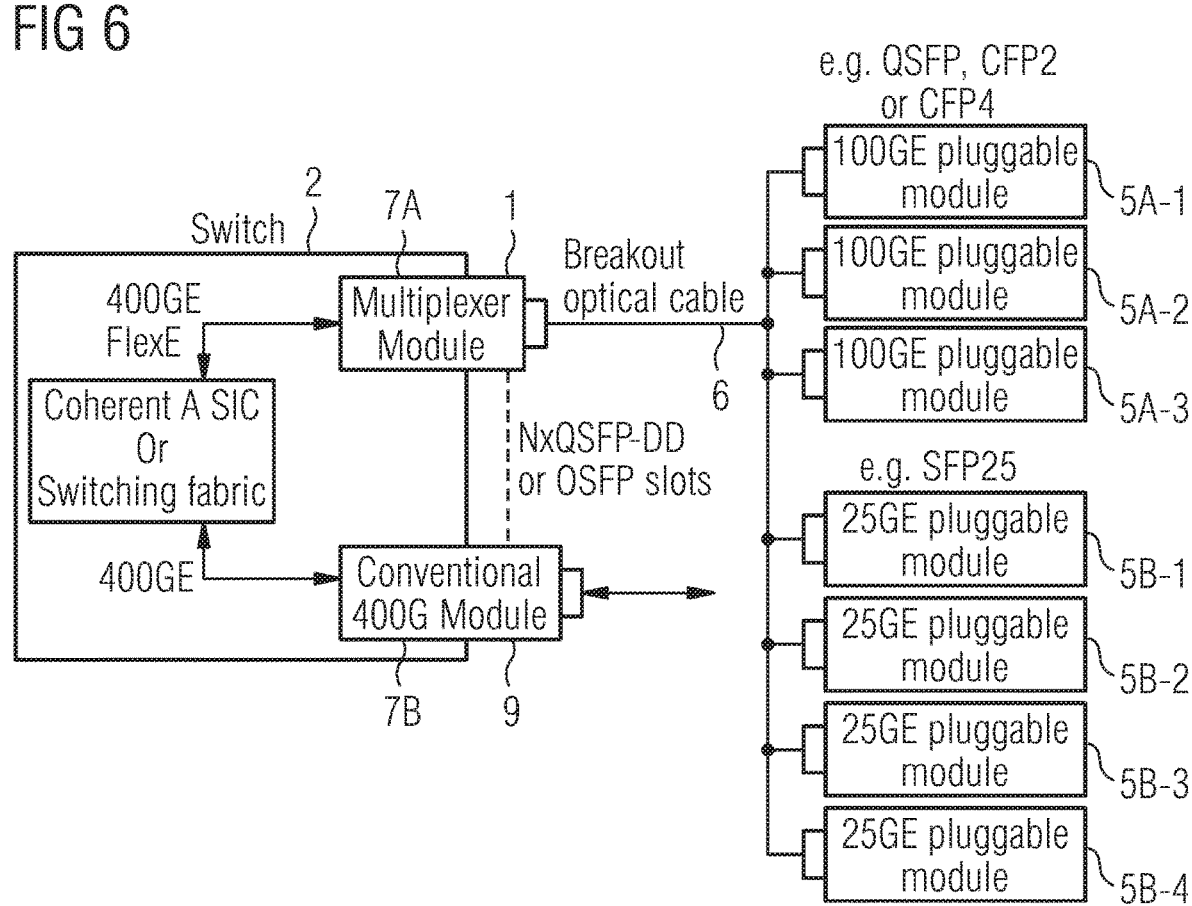
FIG. 6 shows a further exemplary configuration of a network device with a plugged-in pluggable aggregation module according to the first aspect of the present invention.

FIG. 6 illustrates another exemplary network configuration where the multiplexing pluggable aggregation module 1 according to the present invention is connected to both 100GE and 25GE optical legacy modules 5-*i*. The illustrated embodiment of FIG. 6 comprises two different types of legacy modules, i.e. three 100G pluggable 5A-1, 5A-2, 5A-3 and four 25GE pluggable modules 5B-1, 5B-2, 5B-3, 5B-4. Accordingly, the pluggable aggregation module 1 provides in the illustrated configuration of FIG. 6 connections for seven legacy modules 5-*i* with the network device 2 via a single optical breakout cable 6.

The structure and electrical configuration of the optical frontends 3-*i* integrated in the pluggable aggregation module 1 depends on the types of optical legacy modules 5 that it does interface. For instance, the pluggable aggregation module 1 can contain in a possible implementation four sets of 100-Gbit/sec CWDM4 transmitters and receivers to multiplex traffic from four 100GE CWDM4 pluggable modules. In this embodiment, the optical frontend 3 inside the pluggable aggregation module 1 can employ any fitting technology for the transmitters, e.g. EML, DML, VCSEL, and receivers such as PIN or APD given that it can satisfy the optical requirements for CWDM4 optics.

Figure 7:
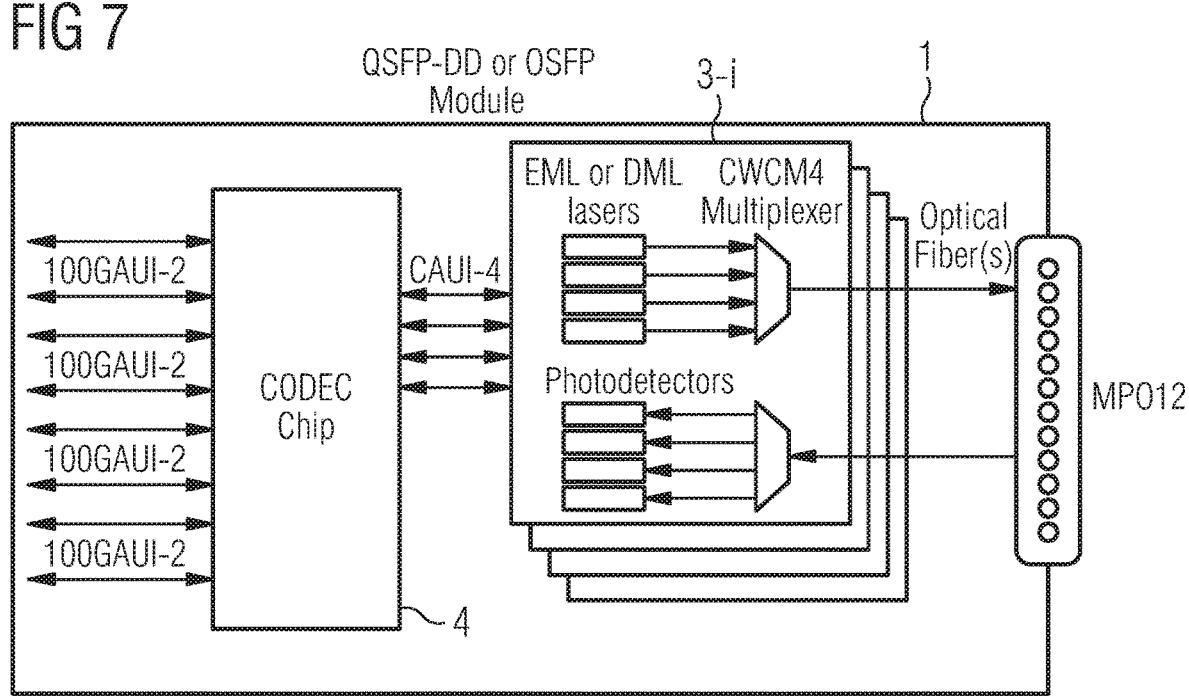
FIG. 7 shows a further exemplary embodiment of a pluggable aggregation module according to the first aspect of the present invention.

FIG. 7 depicts a possible implementation of such a pluggable aggregation module 1 in which eight fibers from four CWDM4 transmitters and receivers are mapped to an MPO12 connector 10. In the illustrated embodiment of FIG. 7, an MPO12-to 4× duplex-LC breakout cable can be used to connect the pluggable aggregation module 1 to four 100GE CWDM4 legacy modules 5 multiplexed by the electrical conversion circuit 4 of the pluggable aggregation module 1.

Figure 8:
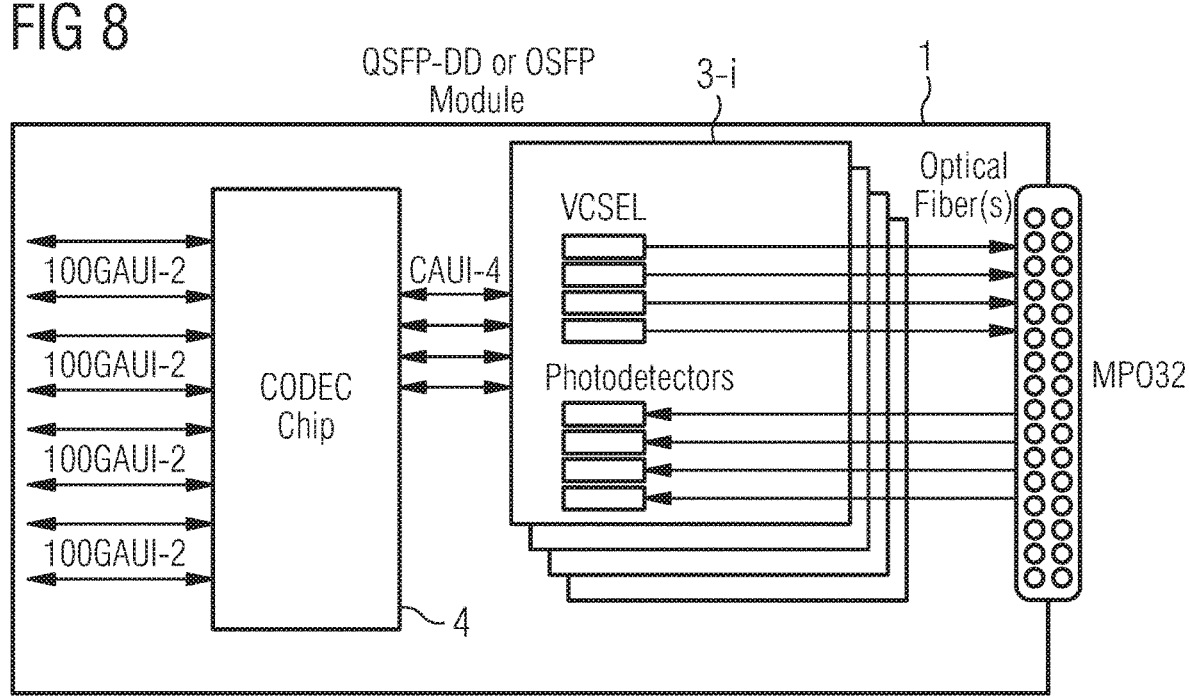
FIG. 8 shows a block diagram of a further possible exemplary embodiment of a pluggable aggregation module according to the first aspect of the present invention.

FIG. 8 illustrates a further example for a SR4 aggregation module. In the illustrated example of FIG. 8, four sets of SR4 transmitters and receivers are used. Each of the transmitters and receivers comprises eight fibers connected to it (4 transmit lanes and 4 receive lanes) that are all connected to an MPO32 connector 11 at the other end. To aggregate traffic from four 100GE SR4 legacy modules 5, an MPO32-to-4×MPO12 breakout cable can be employed. In a possible embodiment, data rates of the channels can be multiplexed to achieve more flexibility.

Figure 9:
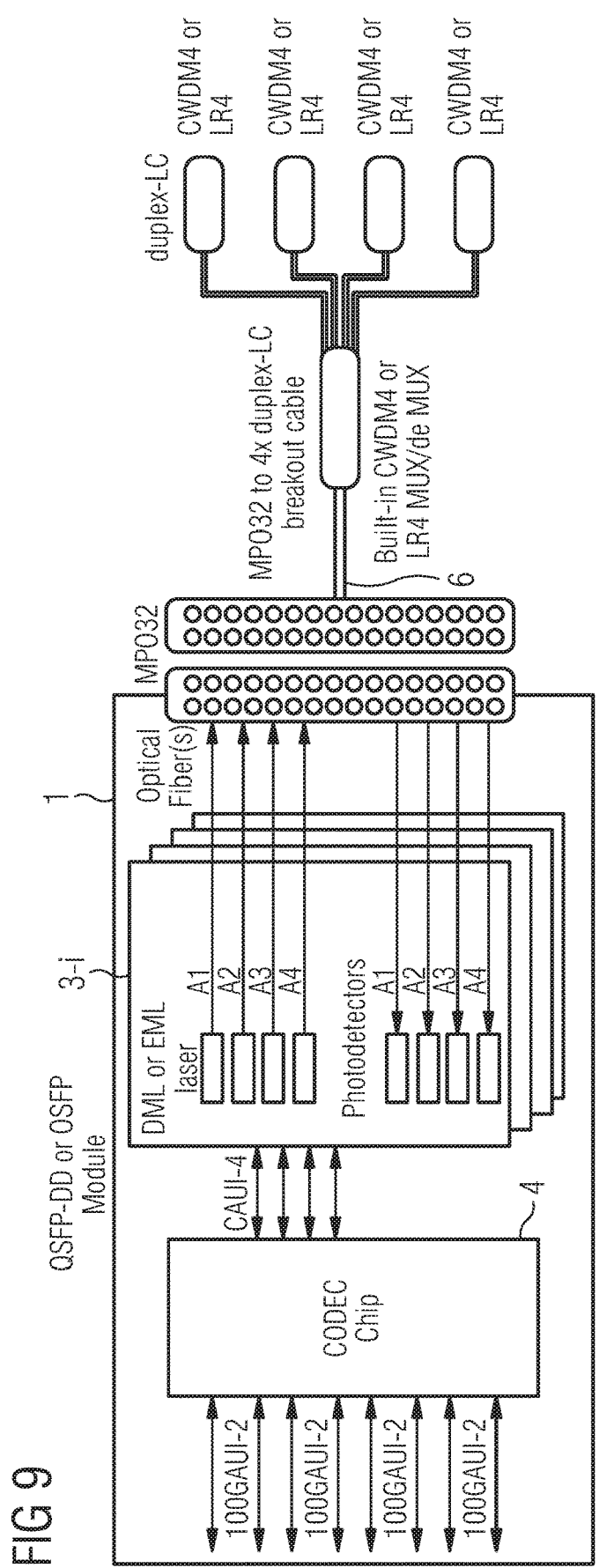
FIG. 9 shows a further exemplary embodiment of a pluggable aggregation module according to the first aspect of the present invention.
Figure 10:
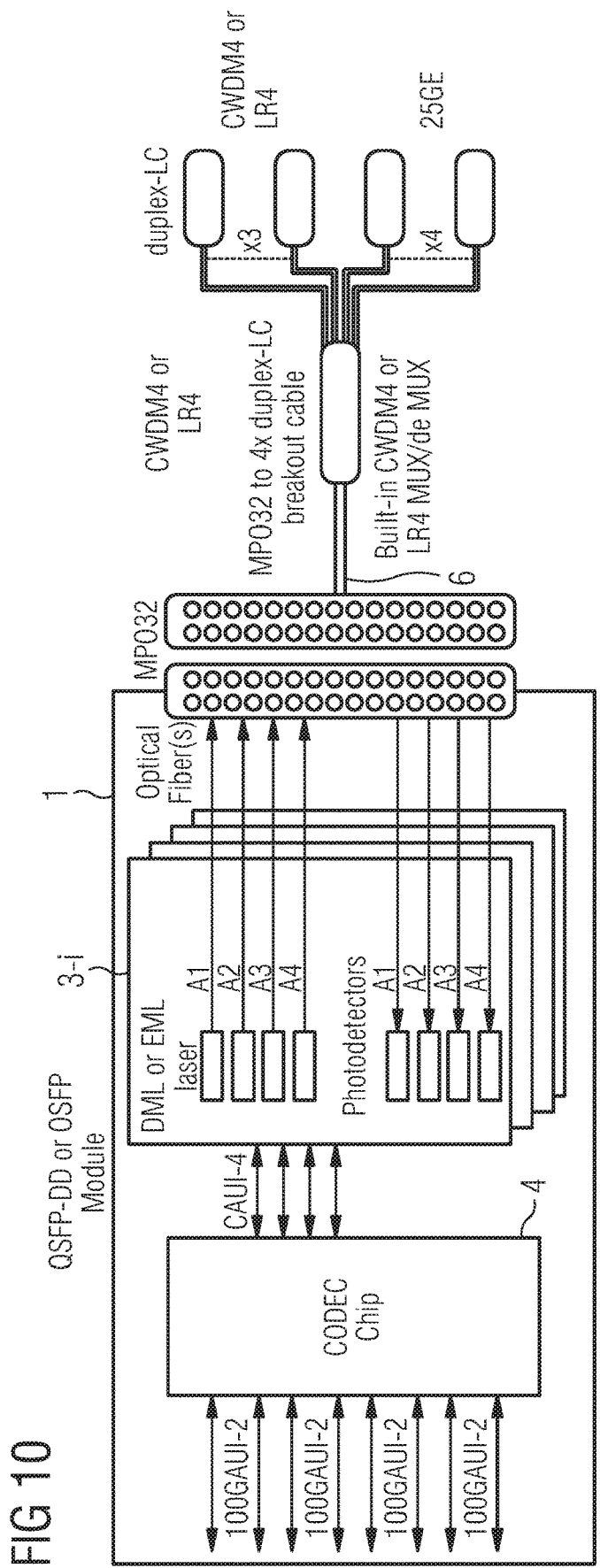
FIG. 10 shows a block diagram of a further possible exemplary embodiment of a pluggable aggregation module according to the first aspect of the present invention.

FIGS. 9, 10 illustrate embodiments where the CWDM4 multiplexer is external to the pluggable aggregation module 1. Accordingly, the CWDM4 multiplexers can be built into the breakout cable 6 which allows for multiplexing of any combination of 100GE and 25GE channels. A further advantage of the illustrated setup is the possibility to support 100 GbE channels from PSM4 modules. The PSM4 pluggable modules can run the 100 GbE traffic over four parallel sets of optical fibers without the need for a CWDM multiplexer.

Figure 12:
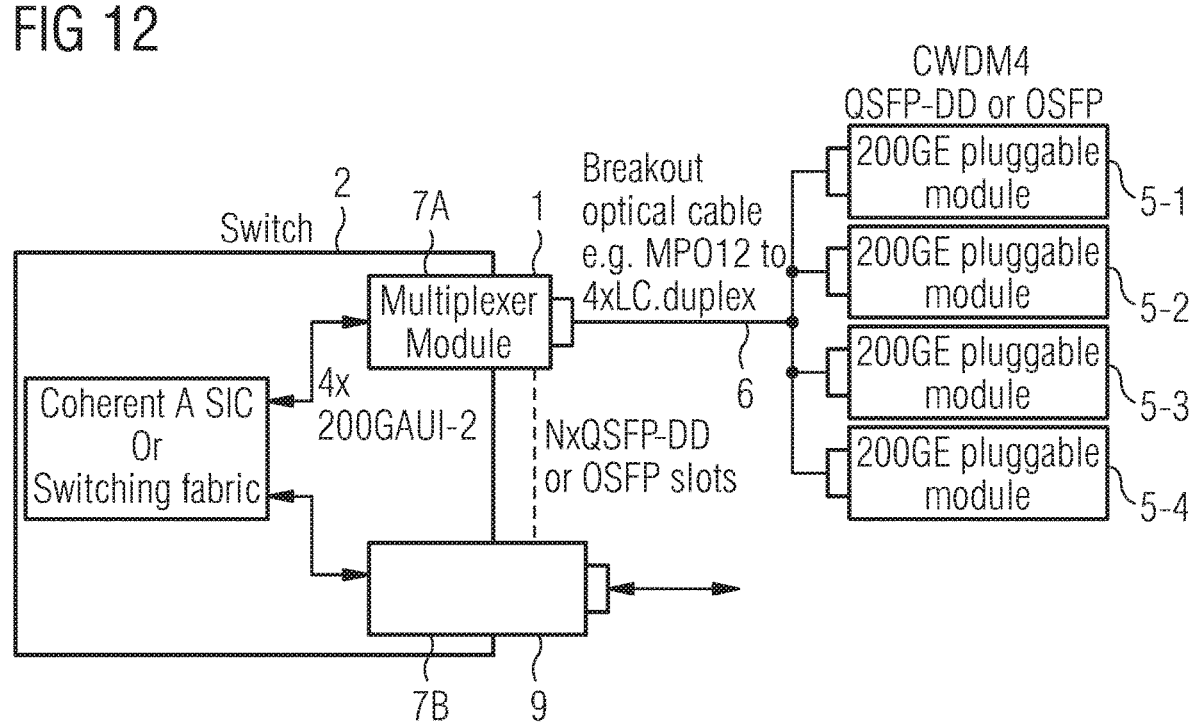
FIG. 12 shows a further exemplary configuration of a network device comprising a plugged-in pluggable aggregation module according to the first aspect of the present invention.

FIGS. 11, 12 illustrate a further possible embodiment of a pluggable aggregation module 1 according to the present invention. In the illustrated embodiment of FIGS. 11, 12, the electrical conversion circuit 4 of the pluggable aggregation module 1 comprises a gearbox chip. In the illustrated exemplary implementation illustrated in FIGS. 11, 12, the aggregation module 1 provides for a 800 Gbit/sec multiplexer module with similar module form factors, i.e. QSFP or QSFP-DD. On the electrical side, this 800 Gbit/sec pluggable aggregation module 1 is interfacing to a switching fabric chip with 4×200GAUI-2 channels each running on two 100-Gbit/sec PAM4 lanes. On the optical side, the pluggable aggregation module 1 is driving four sets of CWDM transmitter and receiver optics with 200GAUI-4 channels. The pluggable aggregation module 1 illustrated in FIG. 11 contains a gearbox chip that is adapted to convert the 4×200GAUI-2 channels into 4×200GAUI-4 channels. No FEC termination or addition is required in the gearbox embodiment illustrated in FIG. 11.

FIG. 12 comprises an exemplary system configuration where the pluggable aggregation module 1 according to the present invention as illustrated in the embodiment of FIG. 11 is connected to four 200GE CWDM4 legacy modules 5-*i*.

The pluggable aggregation module 1 according to the present invention can support different sorts of legacy optical modules 5 deployed today in the field including QSFP, CFP4, CFP2 and CFP. The pluggable aggregation module 1 according to the present invention does not sacrifice any faceplate density on the host board of the network device 2. Further, the pluggable aggregation module 1 does not require replacing any existing legacy modules 5-*i*. Further, the pluggable aggregation module 1 can interface with any of the legacy module form factors deployed in the field. The pluggable aggregation module 1 increases the flexibility in setting up an optical network configuration and does even allow in a possible embodiment to negotiate with the network device 2 and/or legacy modules 5, signal parameters, signal formats, bit rates, FEC types, port counts and/or modulation formats. The pluggable aggregation module 1 according to the present invention can address multiple applications by reconfiguration of integrated basic functions.

What is claimed is:

1. A pluggable aggregation module adapted to be plugged into a network device of an optical network,
said pluggable aggregation module comprising
optical frontends configured to connect said pluggable aggregation module with a corresponding number of modules to exchange optical signals via optical fibres in legacy signal formats; and
an electrical conversion circuit configured to convert the legacy signal formats to an internal signal format used by said network device,
wherein the electrical conversion circuit comprises a Codec chip having serializer/de-serializer circuits connectable to a host board of said network device and serializer/de-serializer circuits connected to the optical frontends integrated in the pluggable aggregation module.

2. The pluggable aggregation module according to claim 1, wherein the electrical conversion circuit comprises a reconfigurable integrated conversion circuit, IC, programmable to convert the signal formats of exchanged optical signal including different legacy formats and internal signal formats.

3. The pluggable aggregation module according to claim 2, wherein the reconfigurable integrated conversion circuit comprises FlexEthernet chip having serializer/de-serializer circuits connectable to a host board of said network device and serializer/de-serializer circuits connected to the optical frontends integrated in said pluggable aggregation module.

4. The pluggable aggregation module according to claim 3, wherein the electrical conversion circuit is configured to multiplex and/or de-multiplex signals exchanged between the network device and different legacy modules.

5. The pluggable aggregation module according to claim 3, wherein the multiplexed and/or de-multiplexed signals comprise Ethernet signals with different data rates.

6. The pluggable aggregation module according to claim 1, wherein the Codec chip comprises FEC encoder and decoder circuits provided for signal format conversions between legacy signal formats and internal signal formats used by said network device.

7. The pluggable aggregation module according to claim 1, wherein the electrical conversion circuit comprises a gearbox chip having serializer/de-serializer circuits connectable to a host board of said network device and serializer/de-serializer circuits connected to optical frontends integrated in said pluggable aggregation module.

8. The pluggable aggregation module according to claim 1, further comprising a negotiation unit adapted to negotiate signal parameters and/or signal formats with the legacy modules and/or with the network device into which the pluggable aggregation module is plugged.

9. The pluggable aggregation module according to claim 8, wherein the negotiation unit is adapted to negotiate the bit rates and/or FEC types and/or port counts of the signals and/or the modulation format.

10. The pluggable aggregation module according to claim 1, wherein the pluggable aggregation module plugged into a socket of a host board of said network device is connected to a switching fabric chip or optical coherent DSP chip of said network device.

11. The pluggable aggregation module according to claim 1, wherein the legacy signal formats comprise a SR4, PSM4, CWDM4 and LR4 signal format or other legacy signal formats.

12. The pluggable aggregation module according to claim 1, wherein the legacy modules comprise QSFP modules, CFP4 modules, CFP2 modules and CFP modules.

13. The pluggable aggregation module according to claim 1, wherein the network device comprises a switch device or a router device of the optical network.

14. A network device comprising a host board having at least one socket to receive a pluggable aggregation module comprising
   optical frontends configured to connect said pluggable aggregation module with a corresponding number of legacy modules of said optical network to exchange optical signals via optical fibres in legacy signal formats; and
   an electrical conversion circuit configured to convert the legacy signal formats to an internal signal format used by said network device,
   wherein the electrical conversion circuit comprises a Codec chip having serializer/de-serializer circuits connectable to the host board of said network device and serializer/de-serializer circuits connected to the optical frontends integrated in the pluggable aggregation module.

* * * * *